April 18, 1939.    K. E. FIFE    2,154,565
OIL FILTER
Filed April 21, 1937
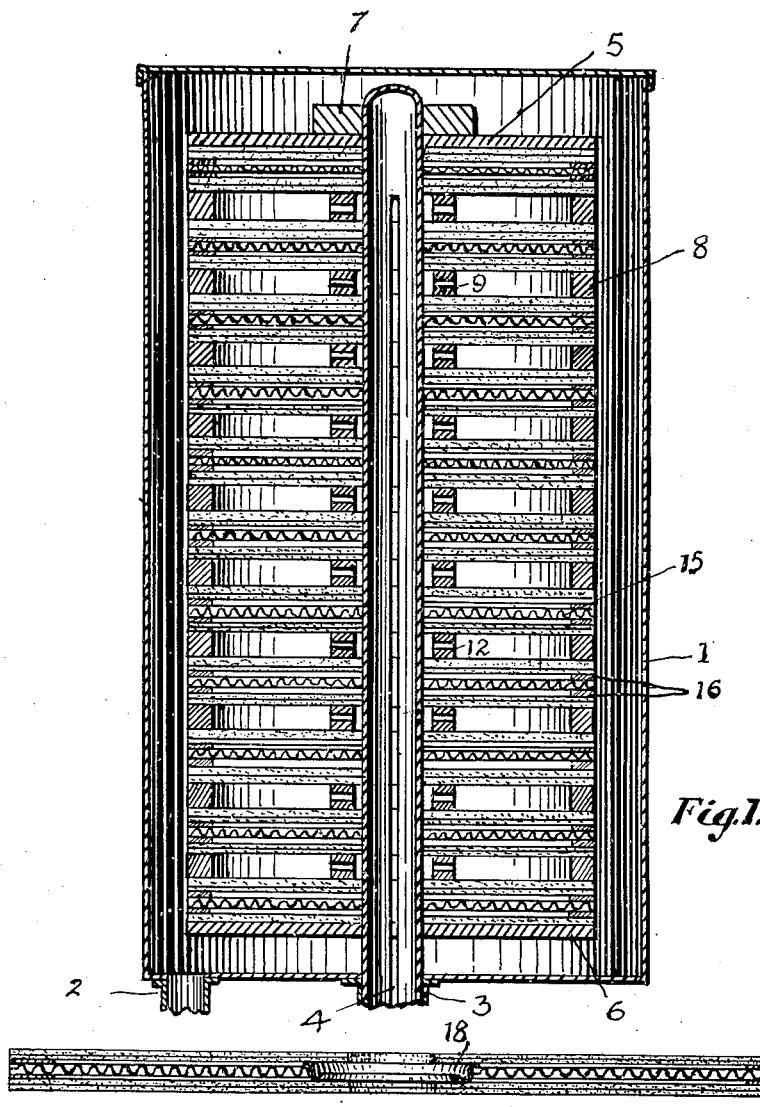
Fig.1.
Fig.2.
Fig.3.
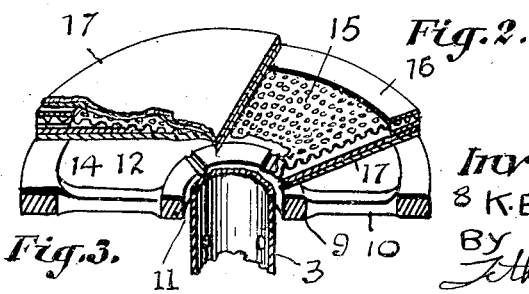
Inventor,
K. E. FIFE
BY
ATTORNEYS Patented Apr. 18, 1939

2,154,565

UNITED STATES PATENT OFFICE 2,154,565

OIL FILTER

Kenneth Elmer Fife, Toronto, Ontario, Canada

Application April 21, 1937, Serial No. 138,225

2 Claims. (Cl. 210—178)

My invention relates to improvements in filters, and particularly to filters for filtering oil and the object of the invention is to devise a filter which will thoroughly eliminate all dirt, sludge, finely divided carbon or any extraneous foreign matter from the oil.

My invention is intended particularly to filter the oil used in automobiles and thereby obviates the necessity of changing the oil frequently as is at present the case, although it will be understood it may be applied to other oils for different purposes.

My invention consists of a casing having a central feeding tube, a series of filtering sections of less diameter than the casing with which the central feeding tube communicates and a discharge pipe for the casing, the parts being otherwise arranged and constructed in detail as hereinafter more particularly explained.

Figure 1 is a vertical section through my improved filter, the parts being exaggerated in size.

Figure 2 is an enlarged cross-section of one of the filtering sections.

Figure 3 is a perspective view partly broken away showing the construction of a filtering section.

In the drawing like characters of reference indicate corresponding parts.

1 is the main casing which has a discharge pipe 2 at the bottom thereof. 3 is the central feeding tube which extends through the bottom of the casing 1 and is closed at the top as indicated. The tube 3 has one or more slots 4 extending throughout its length and nearly to the top.

5 is the top plate and 6 is the bottom plate and through these plates the central tube 3 extends and is secured in position by a nut 7 at the top. Between the plates 5 and 6 the filtering sections extend, being separated from each other and held so separated by the rings 8 which are connected to a central hub 9 by the arms 10. This hub 9 is also in the form of a ring and surrounds the central tube 3 and leaves an annular space 11 around the tube 3. The hub 9 is provided with a series of orifices 12 extending through the hub ring and connecting the space 11 with the space 14.

The filtering section comprises a circular pebbled plate 15, flat circular rings 16 at the periphery thereof both at the top and bottom and circular layers of filter paper 17 in one or more layers and abutting the top and bottom rings 16. An inner ring 18 is provided to extend vertically between the top and bottom layers of filtering paper of each section so as to direct the oil through the paper.

Although I show a slot 4 extending throughout the length of the tube 3 it will be understood that there may be a plurality of slots or a series of holes opposite the hub 9 of the ring 8.

The circular layers of filter paper 17 may be of any number of layers and such filter paper is of a blotter type in order to provide for the elimination of foreign matter.

The operation of my filter is as follows: The oil from whatever source it is derived passes up through the tube 3 and out through the slot 4 into the space 14 through the orifices 12 leading from the space surrounding the tube. When the oil reaches the space 14 it impinges upon the filtering paper above and below the pebbled plate 15 and passes outwardly to the periphery of the same in every case into the casing 1, being purified as it passes through the paper.

From the casing 1 it passes out through the pipe 2. From practical demonstration of my filter I find that the filter paper being of fine texture eliminates acid and holds the sludge which contains acid as well as finely divided carbon. The filter papers which I use are of a blotter type and dry the moisture in the oil so that when it passes through the filter paper the moisture is entirely eliminated.

The pebbled plate which I use is important in that it holds the filter paper from cracking or breaking which would impair its utility. In short, by the use of my filter, not only is acid, sludge and divided carbon eliminated from the oil but also all moisture and the oil issues from the filter free from all impurities.

What I claim as my invention is:

1. In an oil filter in combination a casing provided with a suitable discharge pipe at the bottom, a central feeding tube with an open bottom end extending through the bottom of the casing to a point in proximity with the top and provided with longitudinal slots, plates secured to the tubes near the top and bottom thereof and of less diameter than the casing, a series of sections surrounding the central tube and each comprising a circular pebbled plate extending from the central tube to the periphery of the sections, layers of filtering paper located at each side of the pebbled plates, separating rings comprising a hub of larger internal diameter than the central tube and having radial orifices communicating with the interior of the centre tube and a supporting perimeter for the filtering paper whereby the oil is confined and must pass through such paper, and means for clamping the sections together.

2. In an oil filter, the combination with the casing and suitable discharge therefor, of a central tube open at the bottom end and slotted, filtering discs of paper surrounding the tube, pebbled plates and peripheral rings supporting the filtering paper, separating rings having the hubs thereof of greater diameter than the central tube provided with radial orifices, and an outer perimeter separating the filtering discs in order to cause the oil to pass through the filtering paper to the exterior of the sections into the casing.

KENNETH ELMER FIFE.